March 26, 1963 W. R. BUECHLER 3,083,061
WHEEL COVER CONSTRUCTION
Filed June 22, 1961
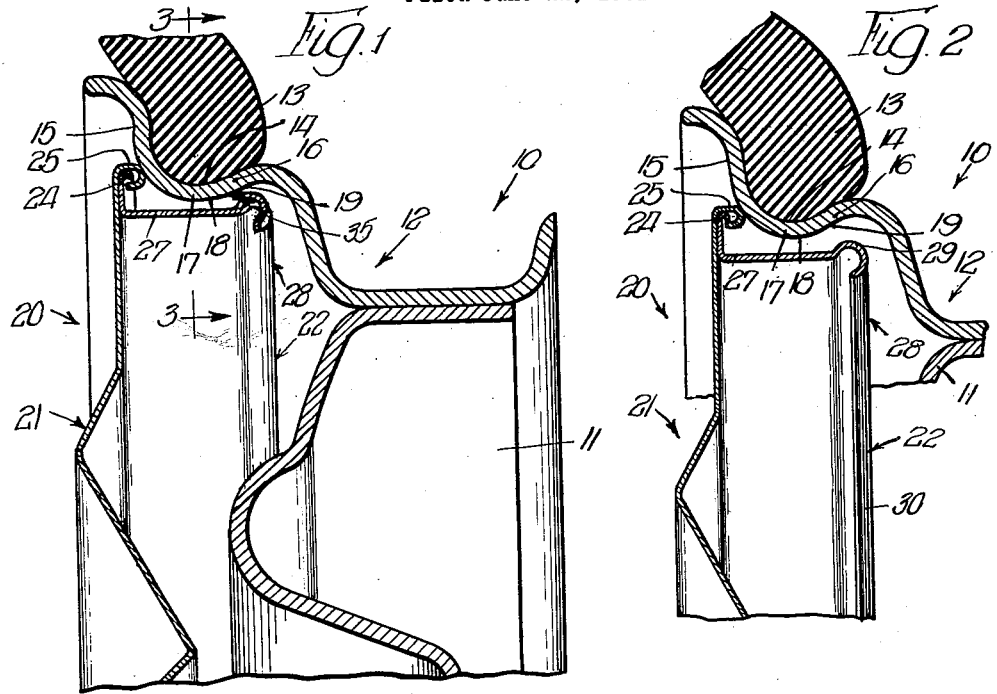
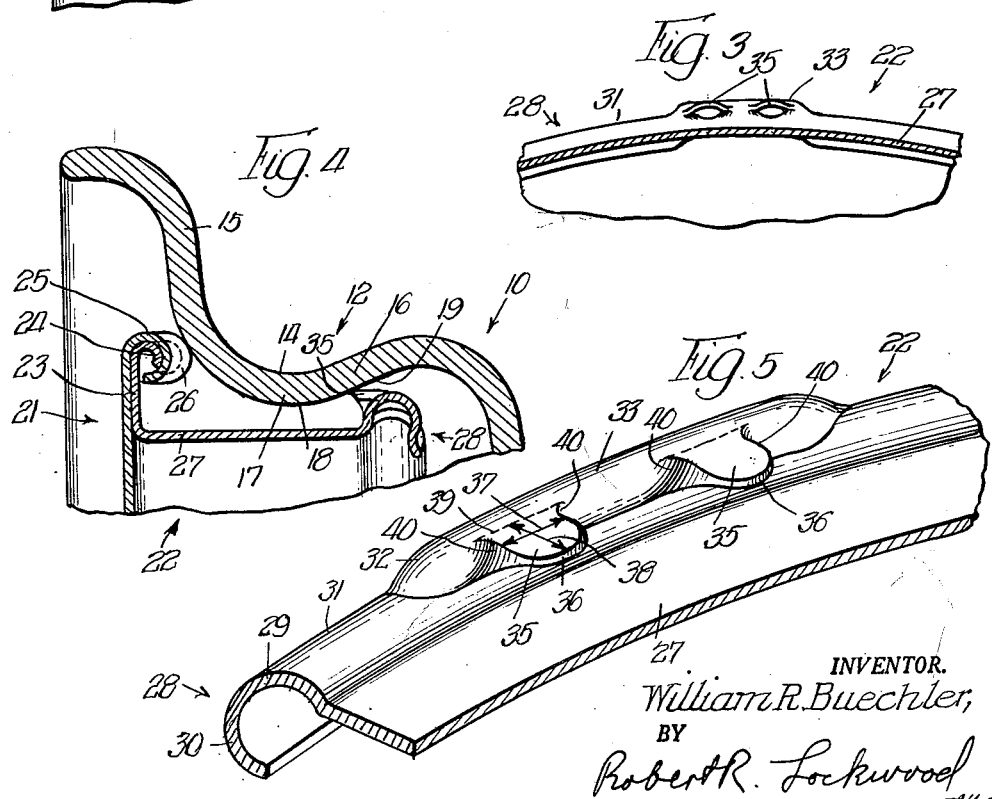
INVENTOR.
William R. Buechler,
BY
Robert R. Lockwood 3,083,061
Patented Mar. 26, 1963

3,083,061
WHEEL COVER CONSTRUCTION
William R. Buechler, Birmingham, Mich., assignor to Thompson Industries, Inc., Indianapolis, Ind., a corporation of Massachusetts
Filed June 22, 1961, Ser. No. 118,971
2 Claims. (Cl. 301—37)

This invention relates to the construction of wheel covers for automobiles and it constitutes an improvement over the wheel cover construction of application Serial No. 118,036, filed June 19, 1961.

Among the objects of this invention are: To provide a new and improved wheel cover construction that is simple and efficient in application and which can be readily and economically manufactured and installed; to increase the frictional grip between a wheel cover and the rim of the wheel on which it is mounted; and to accomplish this by striking lances from nubbins along a bead at the distal edge of a retaining ring on the cover.

In the drawing:

FIG. 1 is a vertical sectional view through a portion of a conventional automobile wheel, showing a portion of the tire, to which a wheel cover embodying the present invention is applied.

FIG. 2 is a view, similar to FIG. 1, but taken at a location removed from the section where FIG. 1 is taken and showing the relationship between the reinforcing bead and the rim of the wheel.

FIG. 3 is a vertical sectional view taken generally along the line 3—3 of FIG. 1 and showing only the cylindrical intermediate section of the wheel cover, the reinforcing bead and the lances struck from one of the nubbins.

FIG. 4 is a view, similar to FIG. 1, but showing the details of construction at an enlarged scale.

FIG. 5 is a perspective view at an enlarged scale of a portion of the cylindrical intermediate section of the wheel cover and showing show the lances extend from one of the nubbins.

Referring now particularly to FIGS. 1, 2 and 4 of the drawing, it will be observed that the reference character 10 designates, generally, a portion of an automobile wheel of conventional construction having a central portion, indicated at 11, that is welded about its periphery to a drop center rim, indicated at 12, that is arranged to receive a conventional automobile tire 13 of which only a portion of a side wall is shown. The side wall of the tire 13 interfits with a groove 14 that is formed between a marginal outwardly inclined annular flange 15 and an intermediate radially outwardly inclined rim section 16 which together provide a convex annular rib 17. The convex annular rib 17 has its innermost surface 18 lying along a circle to which reference will be made presently. Also reference will be made to an inclined wheel cover retaining surface 19 that is located on the inner side of the rim section 16.

Arranged for detachable mounting on the automobile wheel 10 is a wheel cover that is shown, generally, at 20. The wheel cover 20 includes a front face 21 that is die shaped into a pleasing design and it overlies the central portion 11 of the wheel 10 and a major portion of the rim 12. Extending laterally from the front face 21 is a retaining ring that is indicated, generally, at 22. The retaining ring 22 can be formed integrally with the front face 21 or as a separate part and secured thereto as disclosed herein. The retaining ring 22 has an annular outwardly extending flange 23 which overlies the inner side of the front face 21 near its periphery. The flange 23 has a marginal flange bead 24 over which an outer edge 25 of the front face 21 is rolled to securely hold the retaining ring 22 in position on the front face 21. Nubbins 26 are formed at spaced locations along the rolled outer edge 25 of the front face 21 for the purpose of spacing it from the juxtaposed surface of the marginal flange 15.

In the various figures of the drawing it will be observed that the retaining ring 22 has a cylindrical intermediate section 27 the outer diameter of which is substantially less than the diameter of the circle along the innermost surface 18 of the convex annular rib 17. Along the distal edge of the intermediate section 27 there is a reinforcing bead 28 which, as shown more clearly in FIG. 5, includes an out turned section 29 and an in turned section 30. The diameter of the circle containing the outermost surface portion 31 of the reinforcing bead 28 approaches or is substantially the same as the diameter of the circle along the innermost surface 18 of the convex annular rib 17. Integrally formed with and at spaced locations along the reinforcing bead 28 are nubbins 32. For example six nubbins 32 can be employed although a greater or lesser number can be provided as may be desired. The nubbins 32 are formed by a suitable die from the out turned section 29 of the reinforcing bead 28 and they are arranged so that a circle containing the outermost surface 33 thereof is substantially greater than the diameter of the circle along the innermost surface 18 of the convex annular rib 17.

The construction thus far described is essentially the same as that disclosed in the copending application above referred to. In accordance with the present invention provision is made for increasing the holding ability of the nubbins 32 with respect to the inclined wheel cover retaining surface 19. For this purpose lances 35, for example two in number, are struck from each of the nubbins 32. The lances 35 are so positioned that they do not extend radially from the wheel cover 20 any further than the circle containing the outermost surface 33 of the nubbins 32. Each of the lances 35 has a square edge 36 for biting into the juxtaposed inclined wheel cover retaining surface 19.

The configuration of the lances 35 is important. It will be observed that the width indicated at 37 preferably is greater than the length indicated at 38. The purpose of this is to provide a relatively rigid construction capable of substantial endwise thrust. The juncture of each lance 35 with the body of its nubbin 32 is indicated at 39 and at the ends of this juncture there is curved configuration 40—40 of the metal extending between the body of each nubbin 32 and the lances 35 to provide additional rigidity. As a result the lances 35 are able to resist relatively great compressive stress.

As pointed out the lances 35 are located along a circle the diameter of which is substantially greater than the diameter of the circle along the innermost surface 18 of convex annular rib 17. As a result the nubbins 32 through the respective lances 35 apply forces radially outwardly against the inclined wheel cover retaining surface 19 to hold the wheel cover 20 tightly in position so that it is unlikely that it will become dislodged under normal operating conditions. The forces applied through the lances 35 are derived not only from the cantilever spring effect of the cylindrical intermediate section 27 but also from the hoop strength of the continuous reinforcing bead 28. The inclination of the wheel cover retaining surface 19 is such as to cause the lances 35 and nubbins 32 to be further depressed as the wheel cover 20 is removed axially from the wheel 10 with the result that the forces applied through the lances 35 are correspondingly increased. Moreover, since the edges 36 of the lances 35 bear against the inclined wheel cover retaining surface 19, they provide a digging effect into the surface as the wheel cover 20 moves axially away from the fully applied position.

As a result with the spring forces working in combination with the increase in friction provided by the lances 35 and the digging effect thereof, movement of the wheel cover 20 axially away from the wheel 10 is resisted and it tends to stay tightly in position under normal operating conditions.

In placing the wheel cover 20 in operative position on the wheel 10, the nubbins 32 first engage the lowermost portion of the outer surface of the marginal annular flange 15. At this location the diameter of the circle containing the outermost surface 31 of the reinforcing bead 28 approaches or is substantially the same as the diameter of the circle containing the innermost surface 18 of the convex annular rib 17. Further axial motion of the wheel cover 20 toward the fully applied position depresses the nubbins 32. Since the reinforcing bead 28 cannot be reduced in perimeter, the movement of the nubbins 32 radially inwardly causes those portions of the reinforcing bead 28 between the nubbins 32 to move radially outwardly so as to maintain the constant perimeter. As pointed out, since the continuous reinforcing bead 28 because of its hoop strength tends to assume its circular shape, it will apply a force to the nubbins 32 that is transmitted through the lances 35 to the wheel cover retaining surface 19 and thence to the wheel 10.

Because of the direction in which the lances 35 extend from the nubbins 32, when the wheel cover 20 is moved toward the fully applied position, the lances 35 extend in the opposite direction and thus readily slide over the lower portion of the outer surface of the flange 15 underneath the innermost surface 18 of the convex annular rib 17 and upwardly and outwardly along the inclined surface 19. As a result the wheel cover 20 can be applied with a relatively small force while requiring the exertion of a relatively great force in the opposite direction to effect its removal.

What is claimed as new is:

1. In combination, an automobile wheel having a tire receiving rim provided with a convex radially inwardly facing annular rib having a radially outwardly inclined surface on its inner side, a wheel cover overlying said wheel on the outer side of said rib and having an annular retaining ring extending laterally from near the peripheral edge thereof in radially inwardly spaced relation to and beyond said convex annular rib, a bead along the distal edge of said retaining ring constituting an integral extension thereof and spaced from said convex annular rib, said bead having an out turned section merging with an in turned section and an outer diameter not more than the inner diameter of said convex annular rib; a plurality of nubbins integral with, spaced along, and conforming generally to the cross sectional configuration of said bead with their outermost surface portions along a circle whose diameter is slightly greater than the inner diameter of said convex annular rib, and lance means struck from the side of at least one of said nubbins facing said convex annular rib for engaging the juxtaposed surface thereof and increasing the resistance of said wheel cover to dislodgement from said wheel, the juncture of said lance means with the nubbin having a length at least equal to the distance from said juncture to the distal edge of said lance means.

2. In combination, an automobile wheel having a tire receiving rim provided with a convex radially inwardly facing annular rib having a radially outwardly inclined surface on its inner side, a wheel cover overlying said wheel on the outer side of said rib and having an annular retaining ring extending laterally from near the peripheral edge thereof in radially inwardly spaced relation to and beyond said convex annular rib, a bead along the distal edge of said retaining ring constituting an integral extension thereof and spaced from said convex annular rib, said bead having an out turned section merging with an in turned section and an outer diameter not more than the inner diameter of said convex annular rib; a plurality of nubbins integral with, spaced along, and conforming generally to the cross sectional configuration of said bead with their outermost surface portions along a circle whose diameter is slightly greater than the inner diameter of said convex annular rib, and lance means struck from the side of at least one of said nubbins facing said convex annular rib for engaging the juxtaposed surface thereof and increasing the resistance of said wheel cover to dislodgement from said wheel, the juncture of said lance means with the nubbin having a length at least equal to the distance form said juncture to the distal edge of said lance means, those portions of said lance means at the ends of said juncture merging with the nubbin along arcuate sections.

References Cited in the file of this patent

UNITED STATES PATENTS

| 2,772,924 | Landell | Dec. 4, 1956 |
| 2,809,076 | Plotkin | Oct. 8, 1957 |
| 2,860,923 | Lyon | Nov. 18, 1958 |
| 2,870,879 | Gaylord et al. | Jan. 27, 1959 |
| 2,911,258 | Lyon | Nov. 3, 1959 |
| 2,939,743 | Lyon | June 7, 1960 |